United States Patent
Patil et al.

(10) Patent No.: US 12,026,118 B2
(45) Date of Patent: *Jul. 2, 2024

(54) ASYMMETRIC DATA COMMUNICATION FOR HOST-DEVICE INTERFACE

(71) Applicant: Google LLC, Mountain View, CA (US)

(72) Inventors: Nishant Patil, Sunnyvale, CA (US); Liqun Cheng, Foster City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,366

(22) Filed: Nov. 29, 2021

(65) Prior Publication Data

US 2022/0083493 A1 Mar. 17, 2022

Related U.S. Application Data

(63) Continuation of application No. 16/524,964, filed on Jul. 29, 2019, now Pat. No. 11,188,494.

(Continued)

(51) Int. Cl.
*G06F 13/42* (2006.01)
*G06F 13/40* (2006.01)

(52) U.S. Cl.
CPC ...... *G06F 13/4226* (2013.01); *G06F 13/4018* (2013.01)

(58) Field of Classification Search
None
See application file for complete search history.

(56) References Cited

U.S. PATENT DOCUMENTS 5,951,664 A 8/1999 Lambrecht et al.
5,963,548 A 10/1999 Virtanen
(Continued)

FOREIGN PATENT DOCUMENTS

EP 1146429 10/2001
WO WO 2013/048508 4/2013

OTHER PUBLICATIONS

Design-reuse.com [online] "Moving PCI Express to Mobile (M-PCIe)" Mar. 2019, [retrieved Mar. 28, 2019], retrieved from: URL,<chipdesignmag.com/print.php?articleId=5294?issueId=0>, 5 pages.

(Continued)

*Primary Examiner* — Farley Abad
*Assistant Examiner* — Dayton Lewis-Taylor
(74) *Attorney, Agent, or Firm* — Fish & Richardson P.C.

(57) ABSTRACT

Methods, systems, and apparatus, including computer programs encoded on a computer storage medium, are described for performing asymmetric data communication at a host-device interface of a system. The methods include identifying devices coupled to a host of the system and generating a system topology that identifies a connectivity of the devices and identifies bus lanes that enable data transfers at the system. The host determines that a first connection between the host and a first device of the multiple devices has an asymmetric bandwidth requirement. The host configures a set of bus lanes of a data bus connecting the first device and the host to allocate a different number of the bus lanes to data egress from the host than to data ingress to the host. The bus lanes are configured to allocate the differing number of bus lanes based on the asymmetric bandwidth requirement of the first connection.

20 Claims, 5 Drawing Sheets

Related U.S. Application Data

(60) Provisional application No. 62/851,052, filed on May 21, 2019.

(56) References Cited

U.S. PATENT DOCUMENTS

| | | | |
|---|---|---|---|
| 6,366,589 | B1 | 4/2002 | Naudus, Jr. et al. |
| 6,526,469 | B1 | 2/2003 | Drehmel et al. |
| 6,675,209 | B1* | 1/2004 | Britt .................. H04L 47/10 |
| | | | 709/224 |
| 7,136,953 | B1 | 11/2006 | Bisson et al. |
| 7,197,591 | B2 | 3/2007 | Kwa et al. |
| 7,529,752 | B2 | 5/2009 | Hinshaw et al. |
| 7,788,439 | B1 | 8/2010 | Tsu et al. |
| 8,700,819 | B2 | 4/2014 | Dalal et al. |
| 8,948,203 | B1 | 2/2015 | Nolan |
| 9,654,384 | B2 | 5/2017 | Biswas et al. |
| 11,075,929 | B1* | 7/2021 | Li .......................... G06N 20/20 |
| 2004/0088469 | A1 | 5/2004 | Levy |
| 2005/0097243 | A1* | 5/2005 | Yamashita ............ G06F 3/0605 |
| | | | 710/305 |
| 2007/0150762 | A1 | 6/2007 | Sharma et al. |
| 2018/0316588 | A1* | 11/2018 | Miernik .............. H04L 41/5019 |
| 2019/0042524 | A1 | 2/2019 | Das Sharma |
| 2019/0089624 | A1 | 3/2019 | Berchanskiy et al. |

OTHER PUBLICATIONS

Merritt, "Understanding Asymmetric Links, Buffers, and Bi-Directional TCP Performance", University of Colorado, 2004, 84 pages.

Murata et al., "A Study on Asymmetric Operating Systems on Symmetric Multiprocessors", IFIP International Federation for Information Processing, 2007, 14 pages.

PCT International Search Report and Written Opinion in International Application No. PCT/US2019/061676, dated Feb. 5, 2020, 11 pages.

Scogland et al., "Asymmetric Interactions in Symmetric Multi-core Systems: Analysis, Enhancements and Evalution" Proceedings of IEEE Conference on Computer Vision and Pattern Recognition, Nov. 2008, 12 pages.

Solomon, Reducing Power Consumption in Wireless Applications with M-PCIe, Chip Design Magazine, Apr. 2014, 4 pages.

Xie et al., "A Real-time Asymmetric Multiprocessor Reconfigurable System-on-Chip Architecture" Proc. of SPIE vol. 6035, 2006, 12 pages.

Xie et al., "Asymmetric Multiprocessor Reconfigurable System-on-Chip Architecture" Proceedings of IEEE Conference on Computer Vision and Pattern Recognition, 2017, 8 pages.

International Preliminary Report on Patentability in International Appln. No. PCT/US2019/061676, mailed on Dec. 2, 2021, 6 pages.

* cited by examiner

| | Socket0 406 | | | | | | Socket1 404 | | | | | 408 |
|---|---|---|---|---|---|---|---|---|---|---|---|---|
| * RAM Bandwidth \| | QPI Bandwidth \| | QPI I/O Bandwidth \| | PCs Bandwidth \| | RAM Bandwidth\| | QPI Bandwidth | QPI I/O Bandwidth \| | PCs Bandwidth | | | | | |
| * Wr Rd\|RAM,PCIe>QPI QPI>RAM,PCIe\| | OPI>PCIe PCIe>CPI\| | PCIe>RAM,QPI RAM,QPI> PCIe \| | Wr Rd\|RAM,PCIe>QPI QPI>RAM,PCIe\| | PCIe>QPI QPI>PCIe | | | | | | | | |
| * MBx MBx MBx MBx | MBx MBx | MBx MBx | MBx MBx | MBx MBx MBx MBx | MBx MBx | MBx MBx | MBx MBx | | | | | |
| 21.06 33.68 8.30 11.16 | 0.42 0.03 | 0.35 0.93 | 7.63 14.44 | 11.16 8.30 | 0.00 0.00 | 0.90 0.01 | | | | | | |
| 19.62 38.17 10.63 9.89 | 0.04 0.02 | 0.74 0.83 | 7.25 11.84 | 9.89 10.63 | 0.07 0.00 | 0.91 0.01 | | | | | | |
| 18.08 33.20 8.10 8.97 | 0.10 0.02 | 0.67 1.22 | 6.20 10.54 | 8.97 8.10 | 0.03 0.00 | 0.92 0.01 | | | | | | |
| 17.19 29.35 7.35 8.85 | 0.04 0.02 | 0.71 0.99 | 5.28 10.11 | 8.85 7.35 | 0.03 0.00 | 0.85 0.02 | | | | | | |

Fig. 4

ASYMMETRIC DATA COMMUNICATION FOR HOST-DEVICE INTERFACE

CROSS-REFERENCE TO RELATED APPLICATIONS

This is a continuation of U.S. application Ser. No. 16/524,964, filed on Jul. 29, 2019, which claims priority to U.S. Provisional Application No. 62/851,052, filed on May 21, 2019. The disclosures of the prior applications are considered part of and are incorporated by reference in the disclosure of this application.

BACKGROUND

This specification generally relates to asymmetric data communication for various component interfaces of a system, such as a host-device interface.

Devices such as machine learning accelerators, storage components, video transcoding accelerators, or neural network processors generally have asymmetric bandwidth requirements. In some cases, when these devices are connected to a component of a system, e.g., a host, the asymmetry of the bandwidth corresponds to an imbalance in the amount of data being exchanged in a particular direction at a host-device interface of the system.

For example, an ingress data bandwidth for a machine learning accelerator can be more than ten times an egress data bandwidth for the accelerator. The ingress data bandwidth for the machine learning accelerator can correspond to when a host transmits a large amount of data to the accelerator for performing accelerated inference computations at the accelerator, whereas the egress data bandwidth for the accelerator can correspond to when the accelerator transmits a small amount of data to the host to indicate a result of the inference computations.

SUMMARY

Asymmetries in data bandwidth requirements at a system often are not reflected in a configuration of the interconnect sockets, component interfaces, or hardware connections of the system. For example, current interconnect standards, such as the peripheral component interconnect-express (PCI-e) standard, allocate the same number of data bus lanes for host-to-device communications as it does for device-to-host communications. Symmetric bus lane allocations at component interfaces cause inefficiencies when an asymmetry exists between amounts of data that are transferred in either direction at the host-device interface.

Accordingly, this document describes techniques for implementing a software control loop that dynamically configures asymmetric links at respective interconnect locations of a system. The techniques include identifying respective hardware devices that are coupled at least to a host of the system. The host is operable to generate a system topology that identifies a connectivity of the respective devices. Information associated with the connectivity of a device is used to determine the hardware configuration of the device, including asymmetric data transfer capabilities of the device. The system topology also identifies bus lanes of the system and asymmetric links of each device. The software loop references the connectivity of each device and the system topology to configure asymmetries in bidirectional data transfers at the system.

One aspect of the subject-matter described in this specification can be embodied in a method that includes, identifying a plurality of devices that are coupled to a host of a system and generating a system topology that identifies a connectivity of the plurality of devices and identifies bus lanes that enable data transfers at the system. The method also includes determining that a first connection between the host and a first device of the plurality of devices has an asymmetric bandwidth requirement. The method further includes configuring, based on the asymmetric bandwidth requirement of the first connection, a first set of bus lanes of a first data bus connecting the first device and the host to allocate a different number of the bus lanes in the first set of bus lanes to data egress from the host than to data ingress to the host.

These and other implementations can each optionally include one or more of the following features. For example, in some implementations, the method further includes: determining that a second connection between the host and a second device of the plurality of devices has an asymmetric bandwidth requirement; and configuring, based on the asymmetric bandwidth requirement of the second connection, a second set of bus lanes of a second data bus connecting the second device and the host to allocate a different number of the bus lanes in the second set of bus lanes to data egress from the host than to data ingress to the host.

The method can further include: determining data transfer patterns at the system using the system topology; computing the asymmetric bandwidth requirement of the first connection based on the data transfer patterns; and computing the asymmetric bandwidth requirement of the second connection based on the data transfer patterns.

The method can further include: providing, to a software agent, information describing data traffic at the system; determining, using the software agent, data transfer patterns at the system based on statistical analysis of the information or inferential analysis of the information; generating, using the software agent, a prediction indicating a distribution of data traffic for processing one or more workloads at the system; and computing the asymmetric bandwidth requirement of the first connection based on the prediction indicating asymmetric data traffic at the first connection.

The method can further include computing the asymmetric bandwidth requirement of the second connection based on the prediction indicating asymmetric data traffic at the second connection.

In some implementations, each bus lane in the first set of bus lanes is dynamically configurable as a data ingress lane or a data egress lane; and each bus lane in the second set of bus lanes is dynamically configurable as a data ingress lane or a data egress lane.

The method can further include: exchanging data between the host and the first device using the bus lanes in the first set of bus lanes that are allocated to data egress from the host and the bus lanes in the first set of bus lanes that are allocated to data ingress to the host.

In some implementations, the asymmetric bandwidth requirement of the first connection includes an M:N ratio of ingress bus lanes relative to egress bus lanes; and M has an integer value that is greater than an integer value of N.

In some implementations, the asymmetric bandwidth requirement of the second connection includes an N:M ratio of egress bus lanes relative to ingress bus lanes; and N has an integer value that is greater than an integer value of M.

In some implementations, the system includes a processor and an accelerator, and the method further includes: configuring the processor as the host; identifying the accelerator as the first device; and determining that the accelerator is configured to have a connectivity comprising bus lanes that are configured for bi-directional data transfers with the host via the first connection.

In some implementations, the system includes memory and the method further includes: identifying the memory as the second device; and determining that the memory is configured to have a connectivity comprising bus lanes that are configured for bi-directional data transfers with the host via the second connection.

Other implementations of this and other aspects include corresponding systems, apparatus, and computer programs, configured to perform the actions of the methods, encoded on non-transitory computer-readable storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The techniques described in this document can be used to implement asymmetric configurations of bus lanes in data bus connections between devices of a system. The asymmetric configuration is based on asymmetric bandwidth requirements that are generated by a system host using inferences or predictions learned from analyzing data traffic patterns of the system. Predictive analysis of the traffic patterns can yield asymmetric bandwidth requirements that accurately reflect traffic flow at component interfaces of the system.

By using these techniques, the software control loop can more efficiently allocate the data transfer capacity of a given set of bus lanes to reflect actual asymmetric usage based on observed traffic flow patterns at the system. Hence, because the system can more accurately determine the relative magnitudes of to-and-fro traffic, the system can be designed to include fewer bus lanes that are used for providing asymmetric data links. The system can also adjust the asymmetric configuration of certain bus lanes throughout the system to achieve greater efficiency of data communication.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 shows an example diagram that includes information about data traffic at the system of FIG. 1.

Like reference numbers and designations in the various drawings indicate like elements.

DETAILED DESCRIPTION

Figure 1:
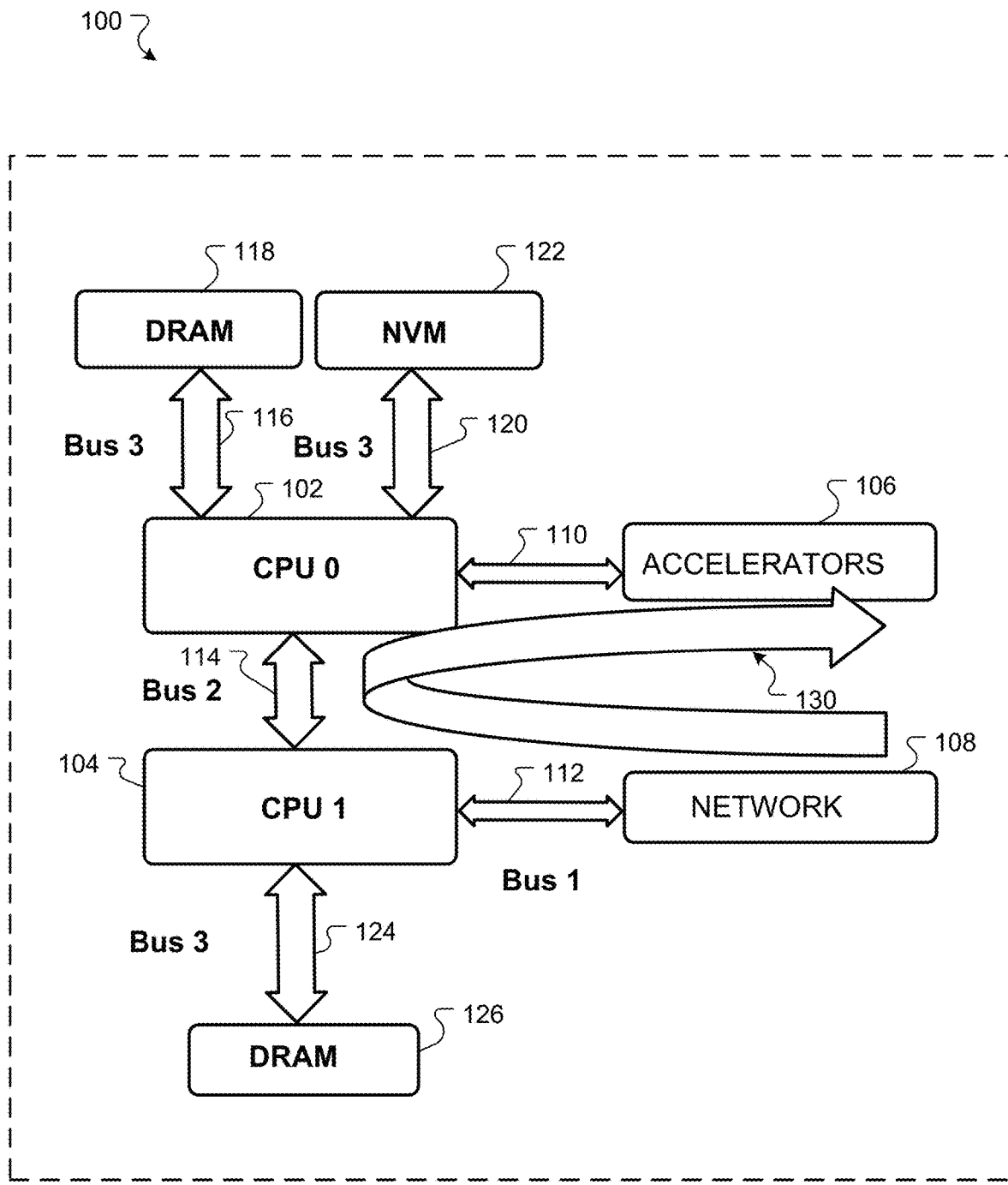
FIG. 1 is a block diagram of an example system for performing asymmetric data communications.

FIG. 1 is a block diagram of an example hardware computing system 100 for performing asymmetric data communications. System 100 generally includes a first processor 102, a second processor 104, a first device 106, and a second device 108. Each of processor 102 or processor 104 can be configured as a system host ("the host") that includes a host interface for coupling or interconnecting various hardware devices at system 100. For example, the system 100 can include one or more special-purpose hardware circuits that each include multiple interconnect locations, such as interconnect sockets or card slots, for establishing a connection with devices 106 and 108.

Processors 102 and 104 can be central processing units (CPUs) or graphics processing units (GPUs) that form at least a portion of the hardware circuits for executing software routines or control functions of the system. A host of system 100 can be represented by a single processor, multiple processors, or multiple different types of processors, e.g., CPUs, GPUs, or special-purpose processors, such as a field programmable gate array (FPGA), or an application specific integrated circuit (ASIC). So, although two processors are shown at FIG. 1, system 100 can include multiple processors or special-purpose components.

In one implementation, processor 102 is configured as a primary processor of the host while processor 104 is configured as a secondary processor of the host. In another implementation, processors 102 and 104 are both configured as co-primary processors of the host. The host can be a domain or software program that executes a software loop 130 (described below) for managing data processing operations, data traffic, asymmetric data flow, and different bandwidth requirements at the system 100. In some cases, the host is an example operating system (OS) running on one or more processors of the system 100. Further, in some examples described below, processor 102 may be referred to as host 102 to indicate instances where processor 102 is configured as the host or as a primary/co-primary processor of the host.

Each of device 106 and second device 108 can be a respective hardware device (e.g., a peripheral device) that interact with one or more components of system 100 at various interconnect locations of the system 100. These interconnect locations can correspond to component interfaces of system 100. In some examples, interactions with a hardware or peripheral device that occur via component interfaces of system 100 may be described with reference to software, such as applications, scripts, or programs, which run on the device.

System 100 includes a component interface 110 that defines a connection between the processor 102 (e.g., the host or host 102) and device 106. Similarly, system 100 includes another component interface 112 that defines a connection between the processor 104 and device 108. In some implementations, devices 106 and 108 are example peripheral devices that are each uniquely configured to include bidirectional data links (described below), such as bidirectional bus lanes or communication channels, which enable various types of symmetric and asymmetric data transfers to occur at system 100.

System 100 can include another component interface 114 that defines a connection between processor 102 and processor 104. In some implementations, processor 102 is a host processor and processor 104 is a co-processor used by the host 102. System 100 can also include another component interface 116 that defines a connection between processor 102 and a first type of memory 118 used by the host. System 100 can also include another component interface 120 that defines a connection between processor 102 and a second, different type of memory 122 that is also used by the host. System 100 can also include another component interface 124 that defines a connection between the processor 104 and a memory 126 that is used by processor 104.

Each of memory 118, 122, and 126 can be different types of memory, the same type of memory, a combination of different types of memory, or part of the same memory structure. For example, each of memory 118, 122, and 126 can be a dynamic/static random access memory (DRAM/SRAM), non-volatile memory (NVM), electrically erasable programmable read-only memory (EEPROM), read only memory (ROM), flash memory, or other known types of computer-readable storage mediums. In some implementations, memory 118 and memory 126 may be the same type of memory or may be sub-sections of the same memory structure.

In general, system 100 can include multiple component interfaces and each component interface is configured to allow data traffic to flow symmetrically or asymmetrically between components at the interface. In some examples, a component interface is a socket or card slot that can receive a card for interconnecting or adding internal components at system 100. For example, a first component interface 110 can receive a PCIe 4.0 card for establishing an asymmetric connection between the host, such as processor 102, and a GPU hardware accelerator, such as device 106.

A second component interface 112 can receive an example network card for establishing an asymmetric connection between a secondary host processor, such as processor 104, and a networked hardware device, such as device 108. In alternative implementations, component interface 112 (or 110) can receive an NVLink bridge card for establishing an asymmetric connection between a first GPU hardware accelerator, such as processor 104, and a second GPU hardware accelerator, such as device 108.

When processor 102 is configured as the host, interface 110 can represent a host-device interface that corresponds to an interconnect location or connection point where data traffic flows asymmetrically between host 102 and device 106. Likewise, when system 100 configures processor 104 as a secondary or co-primary host processor, interface 112 can represent an additional host-device interface that corresponds to another interconnect location or connection point where data traffic also flows asymmetrically between the host 102 and device 108.

System 100 includes one or more data buses. The data buses provide various inter-connected data communication paths for routing data between various components of system 100. Each component interface of system 100 can be associated with a data bus and each data bus includes multiple bus lanes. Each data bus can have a set of bus lanes corresponding to a set of wires that provide a medium for transporting data within the system. Individual bus lanes in a set of bus lanes that form a data bus are each configurable as a bidirectional link at system 100. Each component interface includes a set of bus lanes that are associated with a particular data bus of system 100. For example, bus lanes of component interfaces 110 and 112 may each be associated with a data bus_1 of system 100, whereas bus lanes of component interface 114 may each be associated with a data bus_2 of system 100.

To configure a directionality of the bus lanes at a component interface, system 100 can obtain a hardware definition file that defines a connectivity of one or more devices coupled at the interface. The hardware definition file describes or identifies various symmetric or asymmetric data linking capabilities of an example peripheral device, such as device 106 or device 108. For example, the hardware definition file can indicate whether bus links or interconnect points in a peripheral device are configured for bidirectional data transfer. In some implementations, the interconnect points of the peripheral device interact with the bus lanes included at the component interface to support asymmetric data transfers. For example, using software loop 130, the peripheral device can be configured to leverage corresponding bidirectional capabilities of each bus lane at the component interface to execute asymmetric data transfers.

In some cases, the system 100 transmits a ping packet to a peripheral device 106, e.g., a neural network processor, coupled to the host 102 at component interface 110. In response to receiving the ping packet, the peripheral device can transmit a hardware definition file to the host, for analysis at the host. In some implementations, the hardware definition file indicates symmetric and asymmetric capabilities, such as a number of corresponding bus links at the device, each bus link that is configured for bidirectional data transfer, a maximum data bandwidth supported by each link or interconnect point at the peripheral device, a maximum data transfer rate of each link, or a maximum frequency supported by each link.

Figure 2:
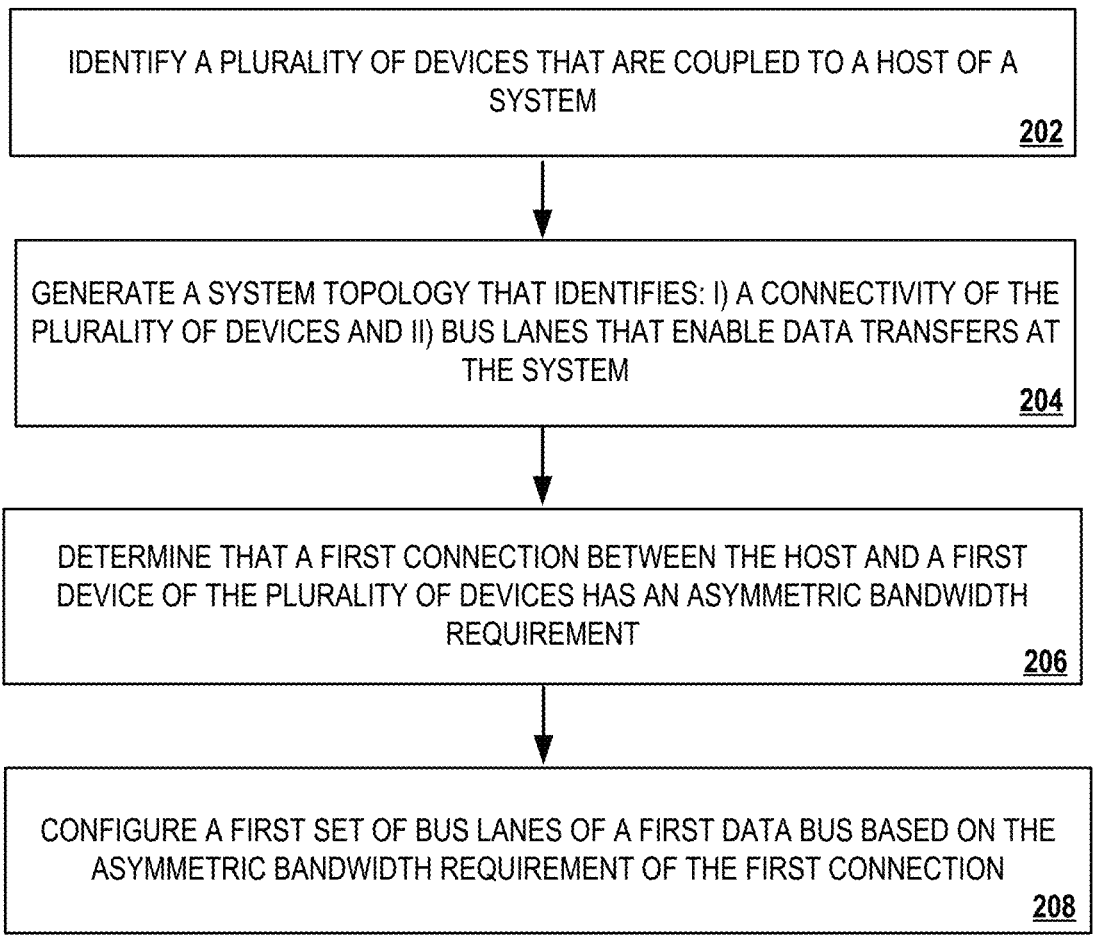
FIG. 2 shows an example process for performing asymmetric data communication using the system of FIG. 1.

FIG. 2 shows an example process 200 for performing asymmetric data communication. Process 200 can be implemented or executed using the system 100 described above. Hence, descriptions of process 200 may reference the above-mentioned computing resources of system 100 as well as other components described in this document. In general, computing steps or process flows included in the descriptions of process 200 can be grouped or arranged to occur in different orders and are not limited to the numerical sequence described herein.

Referring now to process 200, system 100 is configured to identify multiple devices that are coupled at least to a host of the system (202). In some implementations, the host manages a software control loop 130 that is configured to monitor each interconnect location for establishing a connection with one or more of devices 106 and 108. An interconnect location of the system can be represented by a socket or card slot that is integrated at a special-purpose hardware circuit of the system. The system 100 can reference an enumerated list of identifiers for each interconnect location. Each interconnect location can correspond to a component interface for establishing the data connections between components of system 100, e.g., a processor 102 of the host and a hardware accelerator device 106.

The software loop is operable to monitor each connection point at a component interface based on a location identifier for the interface. For example, system 100 uses the software control loop 130 to monitor connection activity at each component interface to identify or determine when a peripheral device couples to the host or to another component at the system. The software control loop can analyze the enumerated list of identifiers and corresponding locations for each identifier to determine the interconnect location of a peripheral device that establishes a data connection at the system. Using the software loop 130, the system 100 is operable to determine a first interconnect location of an accelerator device 106 coupled to the host 102 and to determine a second location of a peripheral device 108 coupled to the host.

System 100 generates a system topology that identifies: i) a connectivity of the multiple devices and ii) bus lanes that enable data transfers at the system (204). The host 102 can use an example BIOS or Linux command line to generate or execute a command, such as a "lspci" command, to identify the locations of each peripheral device 106, 108 coupled to a connection point or component interface of system 100. In some implementations, host 102 generates a command that is processed by the operating system to display a detailed listing of information about all data buses and devices in the system. For example, the listing can be based on a common portable interconnect library (e.g., libpci) representing an interconnect configuration space of an operating system running on a processor of the host 102. The interconnect configuration space is described in more detail below with reference to FIG. 3.

As discussed above, system 100 can generate a ping packet that is provided to a peripheral device 106, e.g., a neural network processor. The device 106 can then transmit a hardware definition file to the host 102, for analysis at the host, in response to receiving the ping packet. In some implementations, the hardware definition file is used to populate information in the interconnect library that describes device configurations of the interconnect configuration space maintained by the operating system.

The device configurations indicate symmetric and asymmetric capabilities of buses and peripheral devices included at system 100. The data and other information associated with the configuration space is used to generate the system topology. In some examples, the system topology identifies the connectivity of each device with asymmetric data transfer capabilities at system 100, including the device's respective location identifier. In other examples, the system topology also identifies the various data buses, and corresponding bus lanes of each data bus, that enable asymmetric bidirectional data transfers at the system.

System 100 determines that a first connection between at least the host and a first device of the multiple devices has an asymmetric bandwidth requirement (206). For example, a connection between devices of system 100 can have a particular asymmetric bandwidth requirement that is based on predictions or inferences that are generated from analyzing data processing operations at system 100. In some implementations, the software loop is operable to monitor data traffic at each component interface based at least on a location identifier for the interface.

System 100 can use the software control loop 130 or the system topology to monitor data traffic at each component interface to identify or determine transfer patterns at the system. For example, the system host interacts with the software control loop 130 and a software agent to determine data transfer patterns for a given set of data traffic using the system topology. The system host provides information describing observed data traffic at system 100 to a software agent managed by the software control loop 130. In some implementations, the software agent is represented by a data processing module that includes a trained machine learning model, such as a machine learning engine or statistical analysis engine. The data processing module is configured to analyze information describing data traffic at system 100.

For example, a data processing module representing the software agent can include an artificial neural network, such as a deep neural network or a convolutional neural network, implemented on a GPU or a special-purpose neural network processor. A neural network of the data processing module can be trained to generate a version of the software agent that is operable to perform inference computations which yield data patterns for predicting asymmetric requirements at component interfaces of the system 100. For example, computations for training the software agent can include processing inputs from the training data through layers of the neural network to configure a set weights to infer or predict asymmetries in observed data flows indicated by the data patterns. In some implementations, the software agent is based on an example support vector machine that uses regression algorithms to perform statistical analysis for predicting asymmetries in observed data flows indicated by one or more data flow patterns.

The information processed at the data processing module can include overall data bandwidth, data rates, data sizes, and amounts of data being transferred in an egress or ingress direction at each connection of the system as well as the particular type of computing workload for which the data was being transferred at the connections. System 100 uses the software agent to determine data transfer patterns at the system based on predictive or statistical analysis of the information. In some cases the transfer patterns are obtained from a machine learning engine that processes the information using example pattern mining algorithms. The machine learning engine derives or predicts the transfer patterns based on inferences computed from the information. In some implementations, the software agent is used to generate predictions indicating a distribution of data traffic that occurs when certain types of data analysis workloads are processed at system 100.

In some implementations, the software control loop 130 causes the trained software agent (or machine learning model) to monitor and analyze data traffic at one or more component interfaces of system 100. For example, the software agent analyzes the observed data traffic at component interface 110 for a given workload to determine various traffic flow patterns between the host 102 and a peripheral device 106. The workload can be an example classification or image recognition task and the peripheral device 106 can represent a GPU hardware accelerator used to accelerate computations for the image recognition task.

The host 102 obtains, via component interface 112, a large set of image data from a networked hardware storage device represented by peripheral device 108. The host 102 uses a set of ingress bus lanes at component interface 110 to provide the large set of image data to the GPU hardware accelerator (device 106). Likewise, device 106 uses a set of egress bus lanes at component interface 110 to provide an output of its computation, such as a text file describing objects recognized in multiple images. For this particular image recognition workload, the software agent analyzes the traffic flow patterns associated with the host's use of the ingress bus lanes that provide the image data to the hardware accelerator. Likewise, the software agent also analyzes the traffic flow patterns associated with the accelerator's use of the egress bus lanes that provide the recognition output to the host.

In some examples, the software agent analyzes inputs describing data bandwidths of the connections, data rates, data sizes, and the relative amounts of data being transferred in an egress or ingress direction at each bus lane or data link. For certain image recognition workloads, the software agent infers or predicts that sets of image data provided via the ingress bus lanes requires a signal bandwidth ranging from 250 Gigabytes (GB) to 300 GB, whereas the output text file provided via the egress bus lanes requires a signal bandwidth ranging from 100 Megabytes (MB) to 25 GB. In some implementations, system 100 has an example maximum signaling technology bandwidth of 100 GB for each ingress bus lane (2×) at component interface 110 and 100 GB for each egress bus lane (2×) at component interface 110. Hence, these four bus lanes can have a total signaling bandwidth of 400 GB.

System 100 uses the software control loop 130 to obtain predictions about data traffic patterns, including data transfer rates, ingress bandwidth requirements, egress bandwidth requirements, and relative sizes of data being routed via certain interfaces for a given workload. Specifically, the control loop uses the software agent to compute asymmetric bandwidth requirements of connections at component interface 110. Based on the computed bandwidth requirements, the software agent is operable to output a predicted ratio of ingress to egress bus lanes that can most efficiently handle the predicted data traffic patterns. For example, the asymmetric bandwidth requirement of component interface 110 can include a 3:1 ratio of ingress bus lanes relative to egress bus lanes. This ratio enables the ingress signaling bandwidth to be dynamically adjusted or increased to meet the example requirements for certain image recognition workloads that may range from 250 GB to 300 GB.

In other systems that do not implement the described techniques, the maximum signaling bandwidth in any one direction (e.g., ingress or egress) is limited to the symmetric signaling bandwidth or the static data link configuration at the system's component interfaces. For example, referencing the signaling bandwidths mentioned above, the ingress bandwidth in these other systems will be limited to 200 GB based on their symmetric data links even though the actual data flow via the ingress path greatly exceeds 200 GB.

In contrast to these other systems, system 100 computes an asymmetric bandwidth requirement of a connection based on a prediction indicating asymmetric data traffic at the connection. For example, the system computes asymmetric bandwidth requirements of a first connection corresponding to component interface 110 based on data transfer patterns that show different types of asymmetric data traffic at interface 110. Similarly, the system can compute asymmetric bandwidth requirements of a second connection corresponding to component interface 112 based on the data transfer patterns that show different types of asymmetric data traffic at interface 112.

Referring again to FIG. 1, system 100 can have a two socket (2S) configuration that includes at least component interfaces 110 and 112. In this configuration, a hardware accelerator 106 is coupled or connected to one socket (interface 110) and a networked device 108 is connected to the other socket (interface 112). As indicated at FIG. 1, an example software loop 130 is operable to manage and control operations involving symmetric and asymmetric data transfers at various data paths, devices, and component interfaces of system 100.

For example, at least one data path extends from the networked device 108, through interface 112 (e.g., a network card) to CPU1 104, through interface 114 to CPU0, and through interface 110 to the accelerator 106. In some examples, at least for component interface 110, the system host can use the software control loop 130 and the software agent to analyze the data transfer patterns and generate predictions indicating that the bandwidth requirements of a host-accelerator interface 110 are entirely or substantially asymmetric. For example, in each step, the accelerator 106 can be used to read a large volume of data from a distributed storage system to perform computations using the data. The storage system can include memory 118, 122, and 126, or various combinations of these memory structures.

The accelerator 106 can read the large volume of data from networked device 108 through component interface 112, perform intensive computation on the data, and output a small volume of data as the summary or result of the computation. In these types of operations, a majority of data is transferred across system 100 in a particular direction, whereas a substantially smaller amount of data is transferred across the system in an opposite direction. This difference in data transfer amounts indicates the asymmetry used to dynamically reconfigure bus lane allocations.

Rather than have the system buses provision the same bandwidth in both directions, the described techniques can be employed to exploit asymmetric bandwidth requirements so that more bus lanes are configured for transfers in the particular direction where the majority of data is transferred across the system. The asymmetries and dynamic allocations to leverage available lane bandwidth translate to improved bandwidth allocation and can contribute to computing efficiencies at system 100.

System 100 is operable to configure a first set of bus lanes of a first data bus based on the asymmetric bandwidth requirement of the first connection (208). In some cases, the first connection defines a connection between accelerator 106 and the host 102. The first set of bus lanes of the first data bus are configured to allocate a different number of the bus lanes in the first set of bus lanes to data egress from the host 102 than to data ingress to the host 102. For example, relative to the host 102, each bus lane can be dynamically configurable as a data ingress lane for receiving ingress data provided to host 102 or a data egress lane for transmitting egress data provided by host 102.

Figure 3:
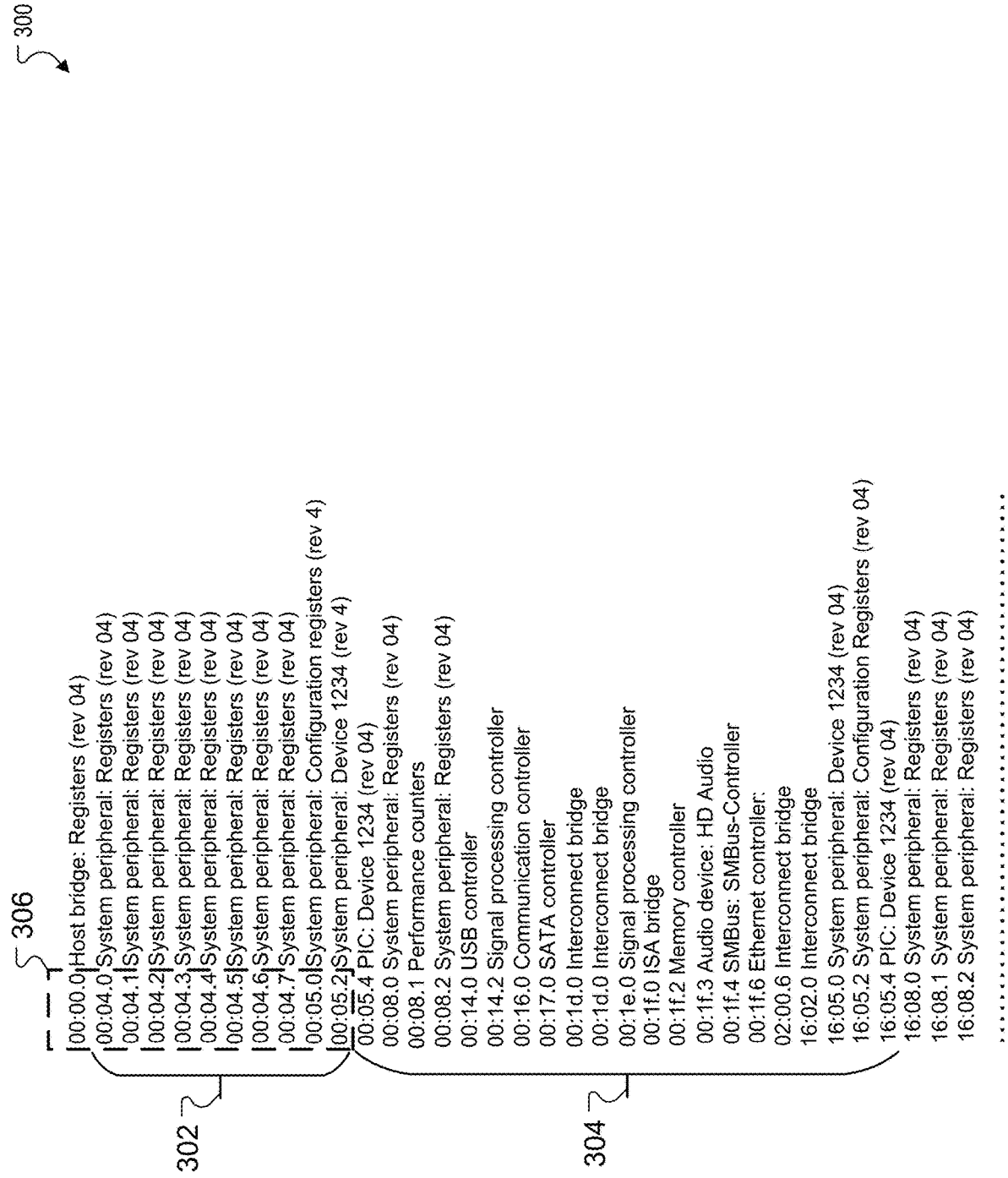
FIG. 3 shows a listing of devices of a system that are used to perform asymmetric data communications.

FIG. 3 shows an example listing 300 of components of system 100 that are used to perform asymmetric data communications. For example, listing 300 can correspond to the detailed listing of information about data buses and devices with connections at component interfaces of system 100. In some implementations, listing 300 is displayed at an example command line in response to the operating system processing a command generated by host 102. The command can be processed to identify the locations of each peripheral devices (e.g., devices 106 and 108) that are coupled to component interfaces of system 100. In some examples, listing 300 is representative of an example interconnect configuration space stored in memory 122 and maintained by the operating system of the host 102.

Listing 300 includes a first subset 302 of components that are associated with one or more peripheral devices of system 100, such as device 106 or device 108. Listing 300 also includes a second subset 304 of components that can each represent a respective peripheral device of system 100, such as a Universal Serial Bus (USB) controller, a Serial ATA (SATA) controller, an audio device, a memory controller, or a signal processing controller. In some implementations, each component in subset 302 can also be a respective device, e.g., an accelerator device. The device can have a set of registers for storing performance data or information describing the results of data processing operations performed by the accelerator.

Listing 300 includes a subset 306 of respective identifiers for each peripheral component or device coupled at system 100, such as a respective identifier for each of processor 104, device 106, and device 108. Subset 306 can represent a portion of an enumerated list of identifiers for each interconnect location that corresponds to a component interface where data flows asymmetrically between at least two devices of system 100. For example, "00:04.1" can represent a location identifier for a component interface that includes a connection between host 102 and a network device 108. The connection can have a particular asymmetric bandwidth requirement. The host 102 uses the asymmetric bandwidth requirement to configure a data bus at the interface to allocate more bus lanes to data ingress from the network device 108 to the host 102 than to data egress from the host 102 to the network device 108.

FIG. 4 shows an example diagram 400 that includes information about data traffic at the system of FIG. 1. In general, an example component interface of system 100 can correspond to socket 402 or socket 404. Each of sockets 402 and 404 can have a data connection that is enabled by a data bus with a predefined number bus lanes, such as 20 bidirectional bus lanes. For a given component interface, a configured allocation that sets a differing number of bus lanes for data egress relative to data ingress is based at least on an asymmetric bandwidth requirement for that component interface.

As described above, system 100 computes an asymmetric bandwidth requirement of a connection based on a prediction indicating asymmetric data traffic at the connection. For example, each of sockets 402 and 404 can include a data connection that has a particular asymmetric bandwidth requirement 406 and 408, respectively. For socket 402, the software agent directly predicts that the asymmetric bandwidth requirement of that connection can include an M:N ratio of ingress bus lanes relative to egress bus lanes, where M has an integer value that is greater than an integer value of N. Likewise, for socket 404, the software agent directly predicts that the asymmetric bandwidth requirement of that connection can include an N:M ratio of egress bus lanes relative to ingress bus lanes, where N has an integer value that is greater than an integer value of M.

Figure 5:
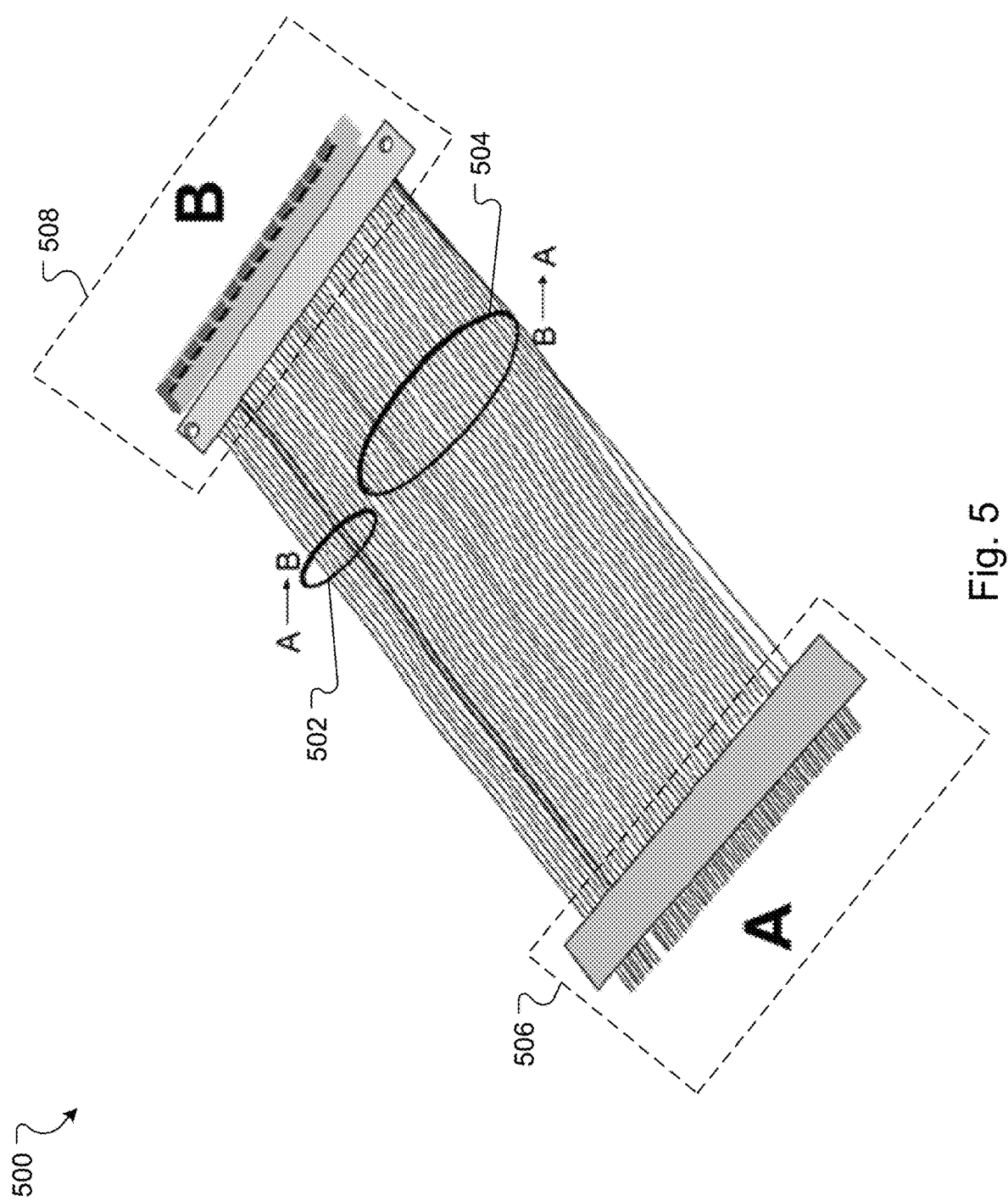
FIG. 5 shows an example hardware connection with asymmetric bidirectional bandwidth capability.

FIG. 5 shows an example connection 500 with asymmetric bidirectional bandwidth capability. The connection 500 can be an example hardware connection which is based on a particular interconnect standard. The interconnect standard can specify configuration preferences for devices and data buses that support asymmetric data transfers at component interfaces of system 100.

Connection 500 can be an example data bus, or a portion of a larger data bus, that provides an inter-connected data communication path for routing data between various components of system 100. Connection 500 includes individual bus lanes that are each configurable as a bidirectional data transport medium at system 100. For example, connection 500 can have 20 individual bidirectional bus lanes that include a first subset of lanes 502 (e.g., five lanes) and a second subset of lanes 504 (e.g., fifteen lanes).

Connection 500 can also include a first interconnect location 506 (A) with multiple connection points or links for coupling to a first device (e.g., host 102) and a second interconnect location 508 (A) with multiple connection points or links for coupling to a second device (e.g., network device 108). Each of locations 506 and 508 can represent an example component interface. In some cases, each of locations 506 and 508 each represent distinct, but related, component interfaces. As described above, each component interface of system 100 can be associated with a data bus and each data bus includes multiple bus lanes. For example, each data bus can have a set of bus lanes corresponding to a set of wires that provide a medium for transporting data at the system.

Based on the described techniques, connection 500 has ends A and B that include connection points for corresponding bus lanes of an example component interface. The bus lanes of connection 500 are configurable to have a number of A→B bus lanes, e.g., for data egress from A to B, being unequal to a number of B→A bus lanes, e.g., for data egress from A to B. In some implementations, the number of bus lanes allocated for transporting data in a given direction corresponds to a magnitude, such as in size, of data traffic in that given direction. This unequal number bus lanes represents an asymmetry in the data traffic that corresponds to an asymmetric bandwidth requirement for a particular connection at system 100.

In some implementations, the asymmetric configuration of bus lanes in connection 500 is achieved by reconfiguring less than half the transceivers at one end (connection point, A) of a data bus as receivers, and reconfiguring the corresponding transceivers at the other end (connection point, B) of the data bus as transmitters. The reconfiguration can occur on a per-application basis. For example, in a GPU application there may be more data going from host 102 to device 106, whereas in an FPGA application there may be more data going from device 106 to host 102.

In some examples, the reconfiguration can occur at boot-time, at virtual machine migration time, or other related computing sessions of system 100. The reconfiguration can also occur dynamically and in response to re-training one or more links of a connection. In this manner, the described techniques can be used to improve computational efficiency of bidirectional communication over a data bus, and thereby the performance of certain applications, without requiring any increase in the raw or fixed transfer rate of a given physical communications link.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving data indicating a connectivity between a host and one or more devices;
   generating predictions of data patterns by monitoring and analyzing data traffic at each connection point between a corresponding device of the one or more devices and the host using at least a software control loop, wherein the software control loop includes a machine learning model trained for processing monitored data traffic to generate the predictions of data patterns that include a prediction of a data transfer rate at each connection point;
   determining that a first connection between the host and a first device of the one or more devices has an asymmetric bandwidth requirement based on the prediction of the data transfer rate at each connection point that has been generated using at least the machine learning model included in the software control loop; and
   configuring, based on the asymmetric bandwidth requirement of the first connection, a first set of bus lanes of a first data bus connecting the first device and the host to allocate a different number of bus lanes in the first set of bus lanes to data egress from the host than to data ingress to the host.

2. The method of claim 1, wherein the received data indicating the connectivity comprises a listing of information identifying the one or more devices and corresponding data buses.

3. The method of claim 1, wherein the received data indicating the connectivity further comprises a listing of identifiers for each interconnect location corresponding to an interface between the host and a device of the one or more devices.

4. The method of claim 3, wherein the software control loop is configured to monitor and analyze data traffic to generate the predictions of data patterns based at least in part on the listing of identifiers.

5. The method of claim 1, further comprising:
   determining that a second connection between the host and a second device of the one or more devices has an asymmetric bandwidth requirement; and
   configuring, based on the asymmetric bandwidth requirement of the second connection, a second set of bus lanes of a second data bus connecting the second device and the host to allocate a different number of bus lanes in the second set of bus lanes to data egress from the host than to data ingress to the host.

6. The method of claim 1, wherein the data patterns include data transfer patterns between the host and the one or more devices, further comprising:
   providing, to a software agent, the data traffic being monitored by the software control loop;
   determining, using the software agent, the data transfer patterns based on inferential analysis of the data traffic;
   generating, using the software agent, a prediction indicating a distribution of data traffic for processing one or more workloads based on the data transfer patterns; and
   computing the asymmetric bandwidth requirement of the first connection based on the prediction indicating the distribution of data traffic at the first connection.

7. The method of claim 1, wherein:
   each bus lane in the first set of bus lanes is dynamically configurable or re-configurable as a data ingress lane or a data egress lane, wherein the dynamic configuration or reconfiguration occurs at boot-time, at virtual machine migration time, or at a time in response to using an updated inference model.

8. The method of claim 1, wherein:
   the asymmetric bandwidth requirement of the first connection comprises an M:N ratio of ingress bus lanes relative to egress bus lanes.

9. A system comprising:
   a host;
   one or more devices coupled with the host, and one or more non-transitory machine-readable storage medium storing instructions that are executable by host to cause performance of operations comprising:
   receiving data indicating a connectivity between the host and one or more devices;
   generating predictions of data patterns by monitoring and analyzing data traffic at each connection point between a corresponding device of the one or more devices and the host using at least a software control loop, wherein the software control loop includes a machine learning model trained for processing monitored data traffic to generate the predictions of data patterns that include a prediction of a data transfer rate at each connection point;

determining that a first connection between the host and a first device of the one or more devices has an asymmetric bandwidth requirement based on the prediction of the data transfer rate at each connection point that has been generated using at least the machine learning model included in the software control loop; and configuring, based on the asymmetric bandwidth requirement of the first connection, a first set of bus lanes of a first data bus connecting the first device and the host to allocate a different number of bus lanes in the first set of bus lanes to data egress from the host than to data ingress to the host.

10. The system of claim 9, wherein the received data indicating the connectivity comprises a listing of information identifying the one or more devices and corresponding data buses.

11. The system of claim 9, wherein the received data indicating the connectivity further comprises a listing of identifiers for each interconnect location corresponding to an interface between the host and a device of the one or more devices.

12. The system of claim 11, wherein the software control loop is configured to monitor and analyze data traffic to generate the predictions of data patterns based at least in part on the listing of identifiers.

13. The system of claim 9, wherein the data patterns include data transfer patterns between the host and the one or more devices, further comprising:
providing, to a software agent, the data traffic being monitored by the software control loop;
determining, using the software agent, the data transfer patterns based on inferential analysis of the data traffic;
generating, using the software agent, a prediction indicating a distribution of data traffic for processing one or more workloads based on the data transfer patterns; and
computing the asymmetric bandwidth requirement of the first connection based on the prediction indicating the distribution of data traffic at the first connection.

14. The system of claim 9, wherein:
each bus lane in the first set of bus lanes is dynamically configurable or re-configurable as a data ingress lane or a data egress lane, wherein the dynamic configuration or reconfiguration occurs at boot-time, at virtual machine migration time, or at a time in response to using an updated inference model.

15. A non-transitory machine-readable storage medium storing instructions that are executable by a host to cause performance of operations comprising:
receiving data indicating a connectivity between the host and one or more devices;
generating predictions of data patterns by monitoring and analyzing data traffic at each connection point between a corresponding device of the one or more devices and the host using at least a software control loop, wherein the software control loop includes a machine learning model trained for processing monitored data traffic to generate the predictions of data patterns that include a prediction of a data transfer rate at each connection point;
determining that a first connection between the host and a first device of the one or more devices has an asymmetric bandwidth requirement based on the prediction of the data transfer rate at each connection point that has been generated using at least the machine learning model included in the software control loop; and
configuring, based on the asymmetric bandwidth requirement of the first connection, a first set of bus lanes of a first data bus connecting the first device and the host to allocate a different number of bus lanes in the first set of bus lanes to data egress from the host than to data ingress to the host.

16. The non-transitory machine-readable storage medium of claim 15, wherein the received data indicating the connectivity comprises a listing of information identifying the one or more devices and corresponding data buses.

17. The non-transitory machine-readable storage medium of claim 15, wherein the received data indicating the connectivity further comprises a listing of identifiers for each interconnect location corresponding to an interface between the host and a device of the one or more devices.

18. The non-transitory machine-readable storage medium of claim 17, wherein the software control loop is configured to monitor and analyze data traffic to generate the predictions of data patterns based at least in part on the listing of identifiers.

19. The non-transitory machine-readable storage medium of claim 15, wherein the data patterns include data transfer patterns between the host and the one or more devices, further comprising:
providing, to a software agent, the data traffic being monitored by the software control loop;
determining, using the software agent, the data transfer patterns based on inferential analysis of the data traffic;
generating, using the software agent, a prediction indicating a distribution of data traffic for processing one or more workloads based on the data transfer patterns; and
computing the asymmetric bandwidth requirement of the first connection based on the prediction indicating the distribution of data traffic at the first connection.

20. The non-transitory machine-readable storage medium of claim 15, wherein:
each bus lane in the first set of bus lanes is dynamically configurable or re-configurable as a data ingress lane or a data egress lane, wherein the dynamic configuration or reconfiguration occurs at boot-time, at virtual machine migration time, or at a time in response to using an updated inference model.

* * * * *